(12) United States Patent
Kumar et al.

(10) Patent No.: US 9,712,960 B2
(45) Date of Patent: Jul. 18, 2017

(54) GEOFENCING

(71) Applicant: Intel Corporation, Santa Clara, CA (US)

(72) Inventors: Arvind Kumar, Beaverton, OR (US); Adam Eckels, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/126,172

(22) PCT Filed: Jun. 28, 2013

(86) PCT No.: PCT/US2013/048633
§ 371 (c)(1),
(2) Date: Dec. 13, 2013

(87) PCT Pub. No.: WO2014/209374
PCT Pub. Date: Dec. 31, 2014

(65) Prior Publication Data
US 2015/0223022 A1    Aug. 6, 2015

(51) Int. Cl.
*H04W 64/00* (2009.01)
*H04W 4/02* (2009.01)
*G08B 21/22* (2006.01)

(52) U.S. Cl.
CPC ............. *H04W 4/021* (2013.01); *G08B 21/22* (2013.01)

(58) Field of Classification Search
CPC .............................. G01C 22/006; G06F 17/10
USPC ............ 455/456, 566, 561, 561.1; 375/267; 702/104, 160
See application file for complete search history.

(56) References Cited

U.S. PATENT DOCUMENTS

| | | | |
|---|---|---|---|
| 8,930,163 B2* | 1/2015 | Kordari et al. | 702/160 |
| 2010/0017126 A1* | 1/2010 | Holcman et al. | 701/300 |
| 2010/0127919 A1 | 5/2010 | Curran et al. | |
| 2012/0096249 A1* | 4/2012 | Rubin et al. | 713/1 |
| 2012/0161958 A1* | 6/2012 | Turon et al. | 340/539.3 |

FOREIGN PATENT DOCUMENTS

WO    2011/133799 A1    4/2011

OTHER PUBLICATIONS

International Search Report and Written Opinion received for PCT Patent Application No. PCT/US2013/048633, mailed on Mar. 25, 2014, 14 Pages.
International Preliminary Report on Patentability received for International Application No. PCT/US2013/048633, mailed on Jan. 7, 2016, 11 pages.

* cited by examiner

*Primary Examiner* — Allahyar Kasraian
*Assistant Examiner* — Farid Seyedvosoghi
(74) *Attorney, Agent, or Firm* — Alpine Technology Law Group LLC

(57) ABSTRACT

In one embodiment an apparatus comprises logic, at least partially including hardware logic, configured to establish a geographic reference point, define one or more geofences relative to the geographic reference point, determine, based on an input from at least one inertial sensor, a location of the apparatus relative to the geographic reference point, and generate a warning signal in response to a determination that the location of the apparatus is outside the one or more geofences. Other embodiments may be described.

25 Claims, 10 Drawing Sheets

GEOFENCING

RELATED APPLICATIONS

None.

BACKGROUND

The subject matter described herein relates generally to the field of electronic devices and more particularly to a system and method to implement geofencing using electronic devices.

The term "geofencing" refers to techniques implemented in mobile computing devices in which virtual perimeters are superimposed on real geographic areas. Alerts or activities may be triggered when a virtual perimeter is approached or crossed. Geofencing techniques may be used in combination with location-based services to offer services or alerts to a user of a mobile device.

Geofencing techniques commonly rely upon network-based location services, e.g., global positioning system (GPS) location services, to determine a location of a mobile computing device. Such network-based location services consume significant amounts of power. Accordingly additional systems and techniques to provide geofencing techniques may find utility.

BRIEF DESCRIPTION OF THE DRAWINGS

The detailed description is described with reference to the accompanying figures.

DETAILED DESCRIPTION

Described herein are exemplary systems and methods to implement geofencing in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Various embodiments described herein enable mobile electronic devices, e.g., smart phones, laptop computers, tablet computers, electronic readers, and the like to implement geofencing operations using location services which operate using relatively low power consumption in comparison to network-based location services. By way of example, geofencing operations may be based on inertial sensors, accelerometers, magnetometers, orientation sensors, gyrometers, or the like. Techniques described herein may find particular application in geofencing operations that involve covering short distances, e.g., between 1 and 20 meters, but the techniques are not limited to short distances. Thus, embodiments described herein enable an electronic device to perform geofencing operations while maintaining a low power consumption profile.

In some embodiments described herein a geofencing manager may be implemented on an electronic device. The geofencing manager may be embodied as logic, e.g., hardware, software, firmware, or combinations thereof which operate on the electronic device or on one or more components thereof. The logic is configured to establish a geographic reference point, define one or more geofences relative to the geographic reference point, determine, based on an input from at least one inertial sensor, a location of the apparatus relative to the geographic reference point, and generate a warning signal in response to a determination that the location of the apparatus is outside the one or more geofences. Further aspects will be described with reference to the figures.

Figure 1:
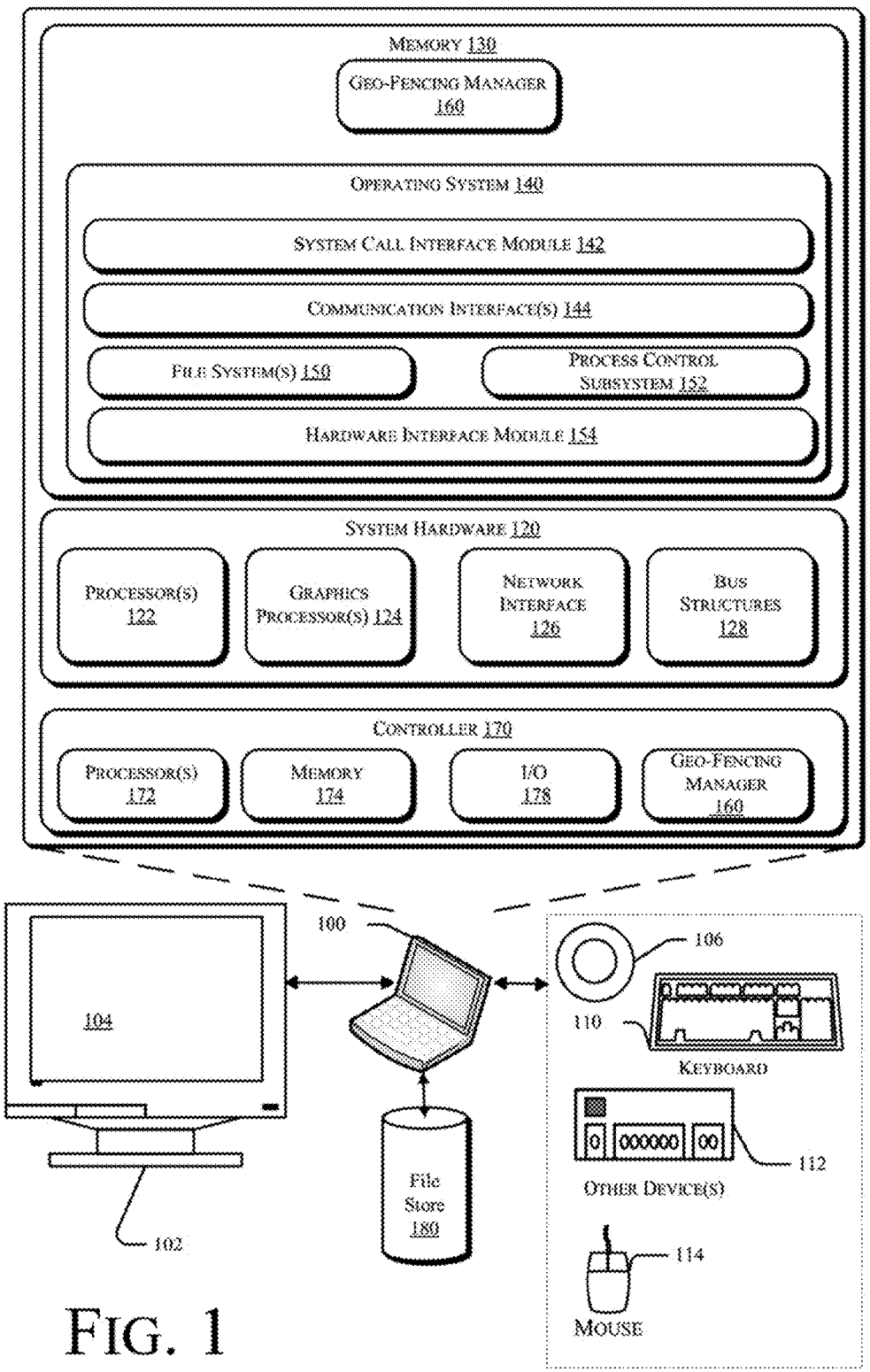
FIGS. 1-2 are schematic illustrations of exemplary electronic devices which may be adapted to implement geofencing in accordance with some embodiments.

FIG. 1 is a schematic illustration of an electronic device 100 which may be adapted to implement context aware geofencing in accordance with some embodiments. In one embodiment, electronic device 100 includes one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, a geolocation device, an accelerometer/gyrometer and any other device that allows the electronic device 100 to receive input from a user.

In various embodiments, the electronic device 100 may be embodied as a personal computer, a laptop computer, a personal digital assistant, a mobile telephone, an entertainment device, or another computing device. The electronic device 100 includes system hardware 120 and memory 130, which may be implemented as random access memory and/or read-only memory. A file store 180 may be communicatively coupled to electronic device 100. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated into the packaging of processor(s) 122, onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA). Extended ISA (EISA), Intelligent Drive Electronics (IDE), VESA Local Bus (VLB), Peripheral Component Interconnect (PCI), Universal Serial Bus (USB), Advanced Graphics Port (AGP). Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on electronic device 100.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux. Solaris, etc.) or as a Windows® brand operating system, or other operating systems.

Memory 130 may comprise one or more applications which execute on the processor(s) 122. The applications may be stored in permanent memory such as file store 180 when not in use by the electronic device 100. In use, the applications may be copied into memory 130 for execution. In the embodiment depicted in FIG. 1 the applications comprise a geofencing manager 160.

In some embodiments electronic device 100 may comprise a low-power embedded processor, referred to herein as a controller 170. The controller 170 may be implemented as an independent integrated circuit located on the motherboard of the system 100. In the embodiment depicted in FIG. 1 the controller 170 comprises a processor 172, a memory module 174, and an I/O module 176. In some embodiments the memory module 174 may comprise a persistent flash memory module and the authentication module 174 may be implemented as logic instructions encoded in the persistent memory module, e.g., firmware or software. The I/O module 178 may comprise a serial I/O module or a parallel I/O module. Because the adjunct controller 170 is physically separate from the main processor(s) 122 and operating system 140, the adjunct controller 170 may be made secure, i.e., inaccessible to hackers such that it cannot be tampered with. In some embodiments the geofencing manager 160 may be implemented in the controller 170 such that the geofencing manager 160 operates in a low power consumption environment.

Figure 2:
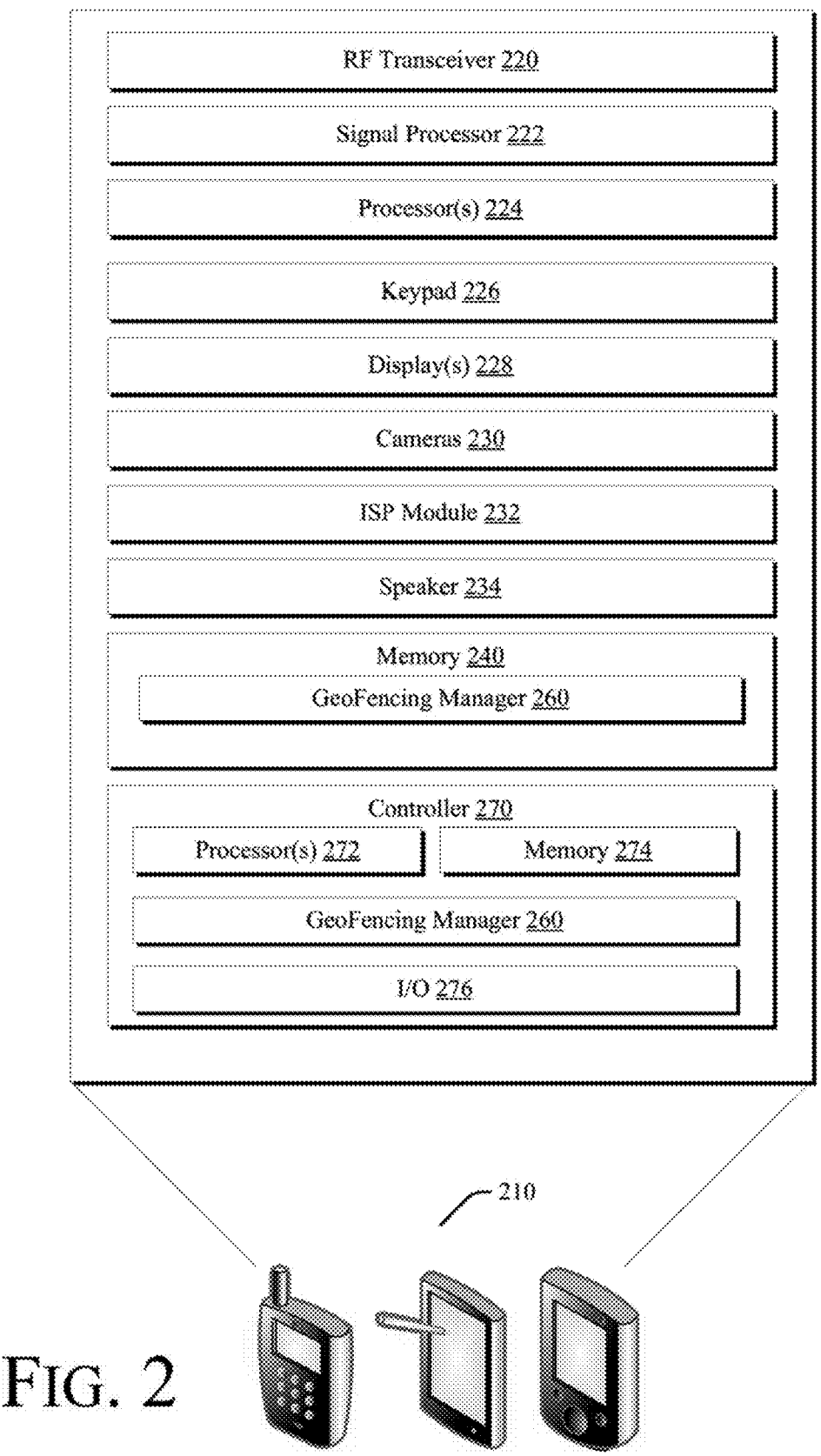

FIG. 2 is a schematic illustration of another embodiment of an electronic device 210 which may be adapted to implement context aware geofencing, according to embodiments. In some embodiments electronic device 210 may be embodied as a mobile telephone, a personal digital assistant (PDA), a laptop computer, or the like. Electronic device 210 may include an RF transceiver 220 to transceive RF signals and a signal processing module 222 to process signals received by RF transceiver 220.

RF transceiver 220 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 210 may further include one or more processors 224 and a memory module 240. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 224 may be one or more processors in the family of Intel® PXA27x processors available from Intel® Corporation of Santa Clara, Calif. Alternatively, other CPUs may be used, such as Intel's Itanium®, XEON™, ATOM™, and Celeron® processors. Also, one or more processors from other manufactures may be utilized. Moreover, the processors may have a single or multi core design.

In some embodiments, memory module 240 includes random access memory (RAM); however, memory module 240 may be implemented using other memory types such as dynamic RAM (DRAM), synchronous DRAM (SDRAM), and the like. Memory 240 may comprise one or more applications which execute on the processor(s) 222. In the embodiment depicted in FIG. 2 the applications comprise a geofencing manager 260.

Electronic device 210 may further include one or more input/output interfaces such as, e.g., a keypad 226 and one or more displays 228. In some embodiments electronic device 210 comprises one or more camera modules 230 and an image signal processor 232, and speakers 234.

In some embodiments electronic device 210 may include a controller 270 which may be implemented in a manner analogous to that of controller 170, described above. In the embodiment depicted in FIG. 2 the adjunct controller 270 comprises one or more processor(s) 272, a memory module 274, and an I/O module 276. In some embodiments the memory module 274 may comprise a persistent flash memory module and the authentication module 276 may be implemented as logic instructions encoded in the persistent memory module, e.g., firmware or software. The I/O module 276 may comprise a serial I/O module or a parallel I/O module. Again, because the adjunct controller 270 is physically separate from the main processor(s) 224, the adjunct controller 270 may be made secure, i.e., inaccessible to hackers such that it cannot be tampered with. In some embodiments the geofencing manager 260 may be implemented in the controller 270 such that the geofencing manager 260 operates in a low power consumption environment.

Figure 3:
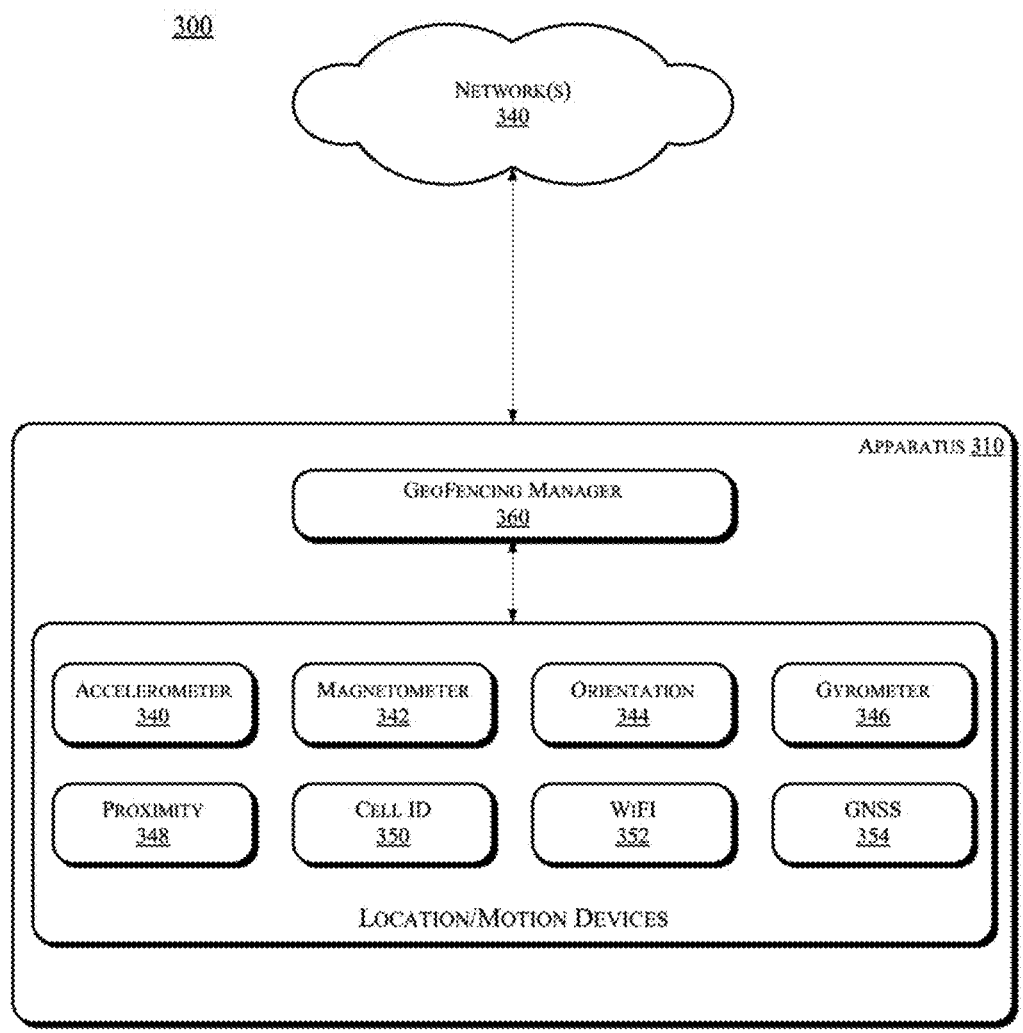
FIG. 3 is a high-level schematic illustration of an exemplary architecture for geofencing in accordance with some embodiments.

FIG. 3 is a high-level schematic illustration of an exemplary architecture for geofencing in accordance with some embodiments. Referring to FIG. 3, a geofencing manager 360 in an apparatus 310 be coupled to one or more location/motion devices to provide location and/or motion inputs to the geofencing manager 360. In some embodiments the location/motion devices may comprise an accelerometer 340, a magnetometer 342, a orientation sensor 344, a gyrometer 346, a proximity detector 348, cellular network identifier 350, a WiFi identifier 352, or a global navigation satellite system (GNSS) receiver 352.

As described above, in some embodiments the geofencing manager 360 implements a geofencing logic which obtains location and geofencing data from various sources depending upon the context in which the electronic device is being used. In some embodiments the algorithm utilizes low-power devices, e.g., accelerometer 340, magnetometer 342, orientation sensor 344, and gyrometer 346 to implement geofencing operations in relatively short distance geofencing environment, thereby reducing power consumption by the electronic device 300.

By way of example, a geofence definition may be received from a user of apparatus 310 via an input interface or from an application executing on the apparatus 310 or a remote device coupled to apparatus 310. In some embodiments a geofence definition can be a point, or a line or boundary, or a geographical area in an arbitrary shape such circle, ellipsis, square, rectangle, arc, polygon, belt, or overlapped zones. The geographic area may be defined by latitude/longitude coordinates, global positioning system (GPS) coordinates or the like. A geofence definition may also include one or more alert conditions. By way of example, a geofence definition may include an alert condition which triggers an alert if the apparatus 310 comes within a predetermined distance of a specified location, crosses a specified boundary, or the like.

Having described various structures of a system to implement geofencing, operating aspects of a system will be explained with reference to FIG. 4, which is a flow chart illustrating operations in a method to implement geofencing in accordance with some embodiments. The operations depicted in the flowchart of FIG. 4 may be implemented by the geofencing manager 360 of the apparatus 310.

Figure 4:
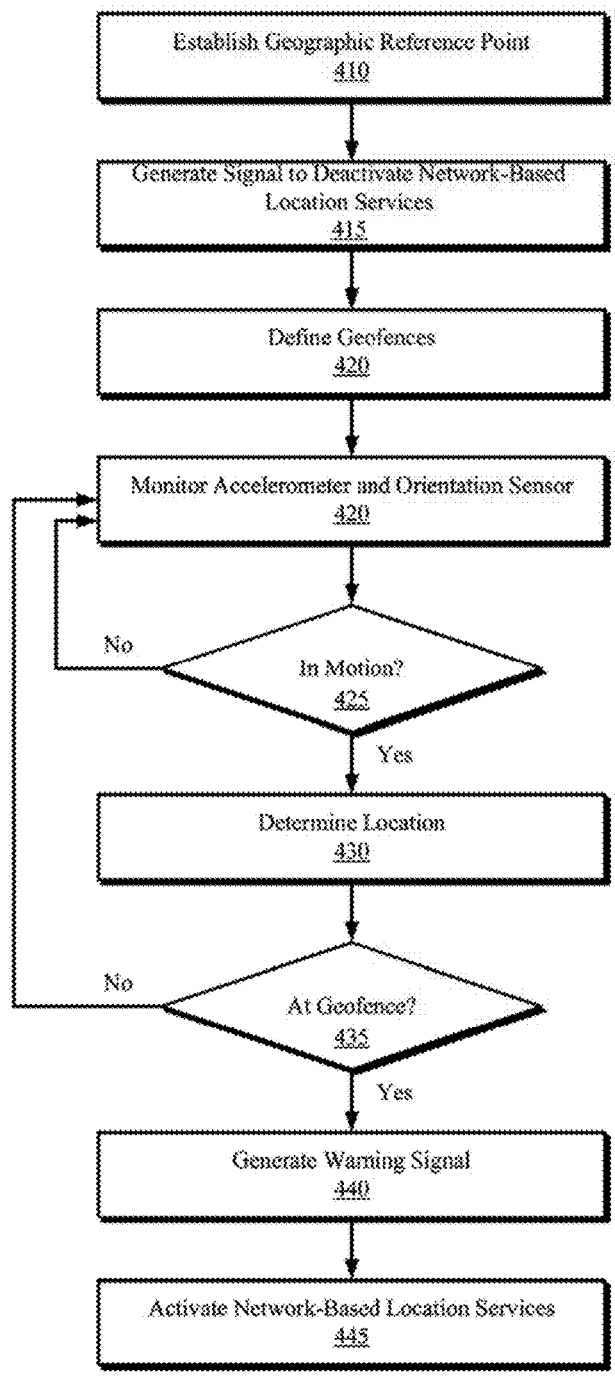
FIG. 4 is a flowchart illustrating operations in a method to implement geofencing in accordance with some embodiments.

Referring to FIG. 4, at operation 410 the geofencing manager 360 establishes geographic reference point for geofencing in the electronic device 300. By way of example, in some embodiments a geographic reference point may be established in response to an input from a user of the electronic device 300 via a user interface. In further examples a geographic reference point may be established in response to a situational context of the electronic device. For example, the geofencing manager may establish a geographic reference point in response to the electronic device 360 remaining stationary for a predetermined period of time. The geographic reference point established in operation 410 may serve as a starting reference point for geofencing operations.

At operation 415 the geofencing manager 360 generates a deactivation signal to deactivate network-based location services. By way of example, in the embodiment depicted in FIG. 3 the geofencing manager 360 may generate a signal to deactivate one or more of the cellular network identifier 350, a WiFi identifier 352, or a global navigation satellite system (GNSS) receiver 352. In some embodiments the geofencing manager 360 may determine a location from one or more network-based location services before the services are deactivated.

At operation 420 one or more geofences are defined relative to the geographic reference point. In some embodiments the one or more geofences may be defined relative to the geographic reference point established in operation 420. For example, a user may input, via a user interface, a geofence of 10 or 20 meters from the geographic reference point and may input a consequence associated with crossing the geofence.

Once the geographic reference point and one or more geofences have been established the geofencing manager 360 may be activated to monitor movement of the apparatus 310. At operation 420 the geofencing manager 360 monitors the accelerometer 340 and the orientation sensor 344 to determine whether the apparatus 310 is in motion. If, at operation 425, outputs from the accelerometer 340 and the orientation sensor 344 indicate that the apparatus 310 is not in motion then the geofencing manager 360 continues to monitor the accelerometer 340 and the orientation sensor 344.

By contrast, if at operation 425 outputs from the accelerometer 340 and the orientation sensor 344 indicate that the apparatus 310 is in motion then the geofencing manager 360 implements operations to determine a location of the apparatus 310 relative to the geographic reference point established in operation 410 and the one or more geofences established in operation 420. In some embodiments the geofencing manager may receive periodic inputs from the accelerometer 340 and the orientation sensor 344 and calculate a location based on the periodic inputs.

In other embodiments the geofencing manager 360 implements a pedometer algorithm which detects when a user holding the apparatus 310 is walking and determines a location of the apparatus based on motions of the user holding the apparatus 310. The pedometer algorithm implements a two-stage process. In the first stage inputs from the accelerometer 340 and the orientation sensor 344 are used to determine a value of acceleration due to gravity. The second stage uses the value determined in the first stage in a user disposition and pedometer algorithm.

In the first stage the geofencing manager 360 samples the accelerometer 340 and the orientation sensor 344 at regular intervals, e.g. every 50 milliseconds for a predetermined period of time and applies a rotation matrix to transform readings from the 3-Axis accelerometer to an orientation in three-dimensional space. Pseudocode to read the sensors and apply a rotation matrix is as follows:

```
AccelerometerReading    ar=FAccelerometer.GetCurrent
   Reading( );
SensorRotationMatrix rm=args.Reading.Rotationmatrix;
double  x=ar.AccelerationX,  y=ar.AccerlerationY,  z=ar.
   AccelerationZ;
FAccel_Stationary.x+=x*rm.M11+y*rm.M12+z*rm.
   M13;
FAccel_Stationary.y+=x*rm.M21+y*rm.M22+z*rm.
   M23;
FAccel_Stationary.z+=x*rm.M31+y*rm.M32+z*rm.
   M33;
```

Once the predetermined sampling time period has elapsed an average value of the acceleration due to gravity on each axis may be determined.

FAccel_Stationary.x*=_1_DIVBY_STATIONARY_ACCEL_SAMPLE_COUNT;
FAccel_Stationary.y*=_1_DIVBY_STATIONARY_ACCEL_SAMPLE_COUNT;
FAccel_Stationary.z*=_1_DIVBY_STATIONARY_ACCEL_SAMPLE_COUNT;

The second stage uses the values derived in the first stage to determine a user disposition, i.e., whether a user holding the apparatus 310 is standing, sitting, or walking with the apparatus, and derives a location based at least in part on the user disposition and inputs from various sensors. In some embodiments the geofencing manager 360 samples the accelerometer 340, the orientation sensor 344, and the gyrometer 346 at regular intervals, e.g. every 100 milliseconds and normalizes the data obtained from the sensors:

double   x=ar.AccelerationX,   y=ar.AccelerationY, z=ar.AccelerationZ;
FAccel_Curr.x=x*rm.M11+y*rm.M12+z*rm.M13−FAccel_Stationary.x;
FAccel_Curr.y=x*rm.M21+y*rm.M22+z*rm.M23−FAccel_Stationary.y;
FAccel_Curr.z=x*rm.M31+y*rm.M32+z*rm.M33−FAccel_Stationary.z;

The data may be smoothed using a moving average with a window size of, e.g., 3.

FAccel_CurrMvgAvg.x=(FAccel_PrevPrev.x+FAccel_Prev.x+FAccel_Curr.x)*ONE_THIRD;
FAccel_CurrMvgAvg.y=(FAccel_PrevPrev.y+FAccel_Prev.y+FAccel_Curr.y)*ONE_THIRD;
FAccel_CurrMvgAvg.z=(FAccel_PrevPrev.z+FAccel_Prev.z+FAccel_Curr.z)*ONE_THIRD;

The data may be further smoothed by combining the current moving average with the previous moving average.

FAccel_Reportable.x=(FAccel_PrevMvgAvg.x+FAccel_CurrMvgAvg.x)*0.5;
FAccel_Reportable.y=(FAccel_PrevMvgAvg.y+FAccel_CurrMvgAvg.y)*0.5;
FAccel_Reportable.z=(FAccel_PrevMvgAvg.z+FAccel_CurrMvgAvg.z)*0.5;

These variable are initialized to zero. The values obtained are then shifted to accommodate the next iteration and after processing.

Copy(FAccel_CurrMvgAvg, ref FAccel_PrevMvgAvg);
Copy(FAccel_Prev, ref FAccel_PrevPrev);
Copy(FAccel_Curr, ref FAccel_Prev);
Copy(FAccel_Reportable, ref FAccel_PrevReportable);

The horizontal and vertical magnitude of the acceleration data may then be determined.

FAccel_Horizontal_Magnitude=Math.Sqrt(FAccel_Reportable.x*FAccel_Reportable.x+FAccel_Reportable.y*FAccel_Reportable.y);
FAccel_Vertical_Magnitude=Math.Abs(FAccel_Reportable.z);

The acceleration data may be used to distinguish between user disposition states. Table 1 is a transition table which reflects the various states and associated conditions.

| State | Sitting instant detected | Sitting timeout detected | Standing instant detected | Standing timeout detected | Walking instant detected |
|---|---|---|---|---|---|
| 0 = Sitting (start) | 0 | — | 2 | — | 5 |
| 1 = Standing but possibly sitting | 1 | 0 | 2 | — | 5 |
| 2 = Standing | 1 | — | 2 | — | 5 |
| 3 = Walking but possibly sitting | 3 | 0 | 4 | 2 | 5 |
| 4 = Walking but possibly standing | 3 | 0 | 4 | 2 | 5 |
| 5 = Walking | 3 | 0 | 4 | 2 | 5 |

Acceleration values may be compared to thresholds to categorize states.

```
bool IsInstantlySitting( )
{
    return FAccel_Vertical_Magnitude <=
        FSittingUpperLimitDetectionThreshold;
}
bool IsInstantlyWalking( )
{
    return FAccel_Vertical_Magnitude >
        FStandingUpperLimitDetectionThreshold &&
        FAccel_Horizontal_Magnitude >
        FStandingUpperLimitDetectionThreshold;
}
```

For example, the user of the device might be categorized as "sitting" if the magnitude of the vertical (i.e., Z-axis) component of the acceleration falls below a threshold, e.g., 0.005 times the force of gravity (G). The user of the device might be categorized as "standing" if the magnitude of the vertical (i.e., Z-axis) component of the acceleration falls below a threshold, e.g., 0.05 times the force of gravity (G) and the magnitude of the horizontal components (i.e., X-axis and Y-axis) of the acceleration fall below a threshold, e.g., 0.05 times the force of gravity (G).

Figure 5A:
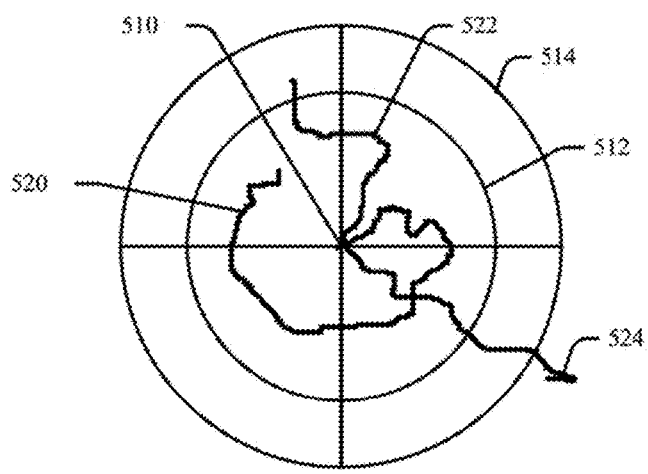
FIG. 5A is a schematic illustration of a geofencing environment in accordance with some embodiments.
Figure 5B:
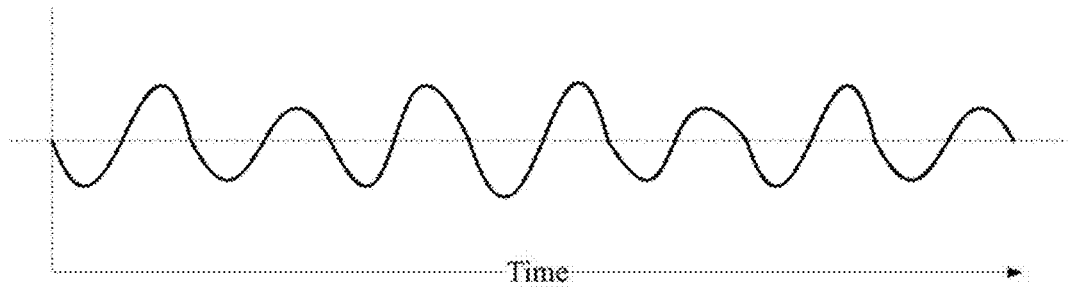
FIGS. 5B-5C are schematic illustrations of motion tracking in a method to implement geofencing in accordance with some embodiments.

FIG. 5B is a schematic illustration of the vertical component of the acceleration taking while a user is walking. Each "V" in the data represents a step taken by the user. Each downward sloping component represents the portion of a step in which the user "falling" forward. Each upward sloping component represents the user "launching" a step. Since each step tends to cycle through a value of 0 twice, a mechanism that prevents the process from erroneously transitioning from the walking state (which is represented by the entire graph) to a sitting or standing state is necessary. To address this contingency the algorithm adds to the core states of sitting, standing, and walking "transitive" states of "standing but possibly sitting," "walking but possibly sitting," and "walking but possibly standing." These transitive states communicate which core state the process is in, in addition to the candidate state that the process should transition to should a timeout occur for the candidate state.

Figure 5C:
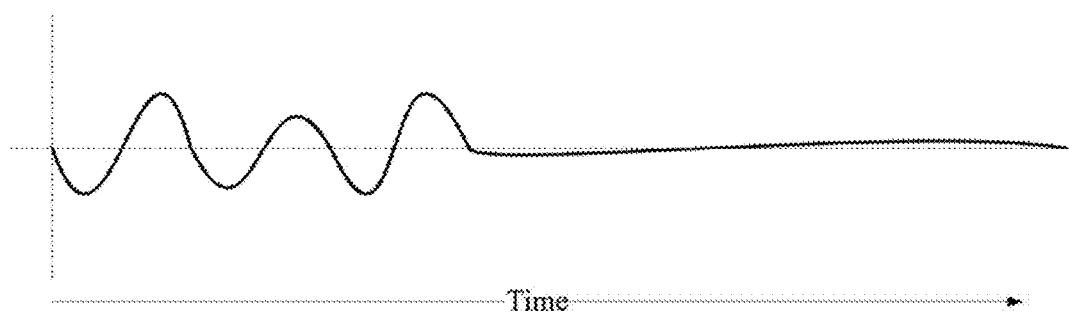

FIG. 5C illustrates a transitive state. There are three steps in the samples, and that they each cycle through 0 twice. So the user-disposition algorithm will alternate between the states of "walking," "walking but possibly standing," and "walking but possibly sitting;" spending most of its time in the walking state. During the walking state, the algorithm resets the variables used to track the time spent in each of the " . . . possibly . . . " states back to 0. When a " . . . possibly . . . " state has been maintained for a certain period of time—which would be the case for the flatter samples on the right side of the illustration—then the appropriate state is finally transitioned to (standing, in this case). At which time, those steps that occurred for the duration of the " . . . possibly . . . " state are removed from the result.

There are two timeout values used: "transition to sitting timeout" and "transition to standing timeout." The timeouts for each of these may be set to a value between 1 and 10 seconds. The algorithm may tweak these timeouts to the smallest possible values. Consider a 10-second timeout. If a user is walking, then standing for 5 seconds, and then decides to start walking again; then the data during those 5 seconds of standing will be misinterpreted as steps merely due to an inadequately minimized timeout.

As suggested, there are also two threshold values used: "sitting threshold" and "standing threshold." A "sitting-type" state will be triggered if the current state is not a sitting-type state and the new magnitude falls at or below the sitting threshold value. Likewise, a "standing-type" state will be triggered if the current state is not a standing-type state and the new magnitude falls at or below the standing threshold value. The " . . . timeout"conditions have a higher precedence than the" . . . instant" conditions.

A pedometer algorithm is executed while the user's disposition is in one of "walking," "walking but possibly sitting." or "walking but possibly standing" states. The pedometer algorithm calculates a distance the user has traveled based on his footsteps by instituting a flag that flips between two states: step down and step up. Step down corresponds to the half-step period when a user is launching a step. The step up state corresponds to the half-step period when a user is falling forward. So the algorithm records the time at which each step-up and step-down event occurs and calculates the distance traveled at the end of each half step, based on the duration of each half step. Since a user can end a walking "session" on either foot, an algorithm based on half steps (rather than whole steps) will be slightly more accurate.

The pedometer algorithm begins by comparing the current reportable z-axis sample to the previous reportable z-axis sample to find a slope:
double slope=FAccel_Reportable.z−FAccel_PrevReportable.z;

This slope instantaneously indicates whether the user is currently launching a step (if the slope is positive) or falling forward (if the slope is negative). If the slope is zero, then there's nothing to do for the algorithm and it returns with no distance to report. That is, the current step state is maintained.

```
double distanceTraveled = 0;
if (slope > 0) // user's launching himself
{
    if (FIgnoreFirstPartialHalfStep__Switch)
    {
        FIgnoreFirstPartialHalfStep__Switch = false;
        FStepState = StepState.FootDown;
    }
    if (FStepState != StepState.FootDown) // end of stepping up
    {
        FStepState = StepState.FootDown;
        distanceTraveled = ProcessHalfStep(ref FAvgStepUpDuration,
            ref FAvgStepUpDuration__Count, ref
            FAvgStepUpDuration__Total);
        FIgnoreFirstPartialHalfStep__Switch = false;
    }
}
else if (slope < 0) // user's falling forward
{
    if (FIgnoreFirstPartialHalfStep__Switch)
    {
        FIgnoreFirstPartialHalfStep__Switch = false;
        FStepState = StepState.FootUp;
    }
    if (FStepState != StepState.FootUp) // end of stepping down
    {
        FStepState = StepState.FootUp;
        distanceTraveled = ProcessHalfStep(ref
        FAvgStepDownDuration,
            ref FAvgStepDownDuration__Count, ref
            FAvgStepDownDuration__Total);
        FIgnoreFirstPartialHalfStep__Switch = false;
    }
} // else we're maintaining the same state for 0 slopes
```

In some embodiments the first partial half step is ignored because it would potentially cause a miscalculated half step. Some people are "bouncier" than others when they walk, and that impacts the algorithm's ability to accurately interpret steps because the trend of each step will look more like an "M" (when shifted by a half step) rather than a "V." The additional step of smoothing the data in the preparation step using the average of the current and previous moving averages virtually eliminates this unwanted oscillation and reduces miscalculations such as when the user transitions from sitting to standing, by simply ignoring them.

```
double ProcessHalfStep(ref double avgHalfStepDuration,
        ref int avgHalfStepDurationCount, ref double avgHalfStepDurationTotal)
{
    double distanceTraveled = 0;
    double halfStepDurtion =
        FAccelTimestamp.Subtract(FLastPartialStepTimestamp).Duration( ).TotalSeconds;
    FLastPartialStepTimestamp = FAccelTimestamp;
    // ensure it's a valid half-step, first:
    //   <= 2.5 steps/sec max -and- >= 0.66... steps/sec min
    if (halfStepDuration >= 0.2 && halfStepDuration <= 0.75)
        if (halfStepDuration > avgHalfStepDuration * 0.39)
        {
            distanceTraveled = CalcHalfStepDistance(halfStepDuration);
            ++avgHalfStepDurationCount;
            avgHalfStepDurationTotal += halfStepDuration;
            avgHalfStepDuration = avgHalfStepDurationTotal / avgHalfStepDurationCount;
        }
        // else ignore errant readings
    return distanceTraveled;
}
```

The first two checks constrain the valid range for steps per second, while the second one constrains the lower limit even further relative to the user's current average stepping rate. The constant 0.39 was experimentally determined.

The half-step distance is calculated using a slightly non-linear (a quadratic) relationship between step duration and step length.

```
double CalcHalfStepDistance(double durationInSecs)
{
    return 0.7329 * durationInSecs * durationInSecs - 1.144 *
        durationInSecs + 0.5869;
}
```

The final part of the process involves the heading from the gyrometer. This is done at the beginning when the accelerometer and orientation sensor readings are also read.

AccelerometerReading ar=FAccelerometer.GetCurrent Reading( );
    OrientationSensorReading osr=FOrientationSensor.Get CurrentReading( );
    CompassReading cr=FCompass.GetCurrentReading( );

Each set of all sensor data should be collected close in time. Using the calculated distance and the direction, a new position may be determined by adding the new displacement to the previous position.

double degree=360−FCompassHeading+90;
    if (degrees>=360) degrees−=360;
    double radians=degrees*PI_DIV_180;
    FPosition.x+=distanceTraveled*Math.Cos(radians);
    FPosition.y+=distanceTraveled*Math.Sin(radians);

In one embodiment the standing detection threshold (i.e., its upper limit) is set at 0.035 times the force of gravity (G). The sitting detection threshold (i.e., its upper limit) is 0.008 times the force of gravity (G). Both of the timeouts (i.e., "transition to sitting" and "transition to standing") are 3 seconds. If a user starts walking and then stops walking for a period less than a certain specified amount of time (e.g., 3 seconds), then the user's location will be rolled back to the user's location at the time the user started walking. So each walking "session" must occur for a minimum period of time. This reduces transitory sensor output that may be misinterpreted as footsteps, obtained during sitting-to-standing transitions in particular. It is also useful for eliminating other errant readings/calculations such as the user repositioning or jiggling his device.

Thus, the pedometer algorithm collects inputs from the low-power sensors on the apparatus 310 and determines a location of the apparatus 310 relative to the geographic reference point established in operation 410 and relative to the one or more geofences established in operation 420. Referring to FIG. 5A, in one example a geographic reference point 510 may be defined in operation 410. A first geofence 512 may be defined at a first distance from the geographic reference point 510 and a second geofence 514 may be defined at a second distance from the geographic reference point 510.

If, at operation 435, the current location of the apparatus 310 is not at a geofence then control passes back to operation 420 and the geofencing manager 360 continues to monitor the location of the apparatus 310. This scenario is illustrated by the trajectory identified by reference number 520. By contrast, if at operation 435 the apparatus crosses a geofence as illustrated by reference numerals 522 and 524 then control passes to operation 440 and the geofencing manager 360 generates a warning signal. The warning signal may be passed to other components of the apparatus 310. By way of example, in embodiments in which the apparatus 310 is incorporated into an electronic device like those presented in FIGS. 1-2 the warning signal may cause an alarm to be presented on a user interface of the electronic device. The alarm may be visual, audible, or both. Further, the electronic device may implement additional security measures, e.g., encrypting data on the device, placing the device into a lock-down state that requires a password to activate, or the like.

At operation 445 the geofencing manager may activate one or more of network-based location services on the apparatus, e.g., the cell ID service 350, the WiFi service 352 or the GNSS service 354. For example, this may allow a user of the apparatus 310 to locate the device if it is misplaced or stolen.

Figure 6:
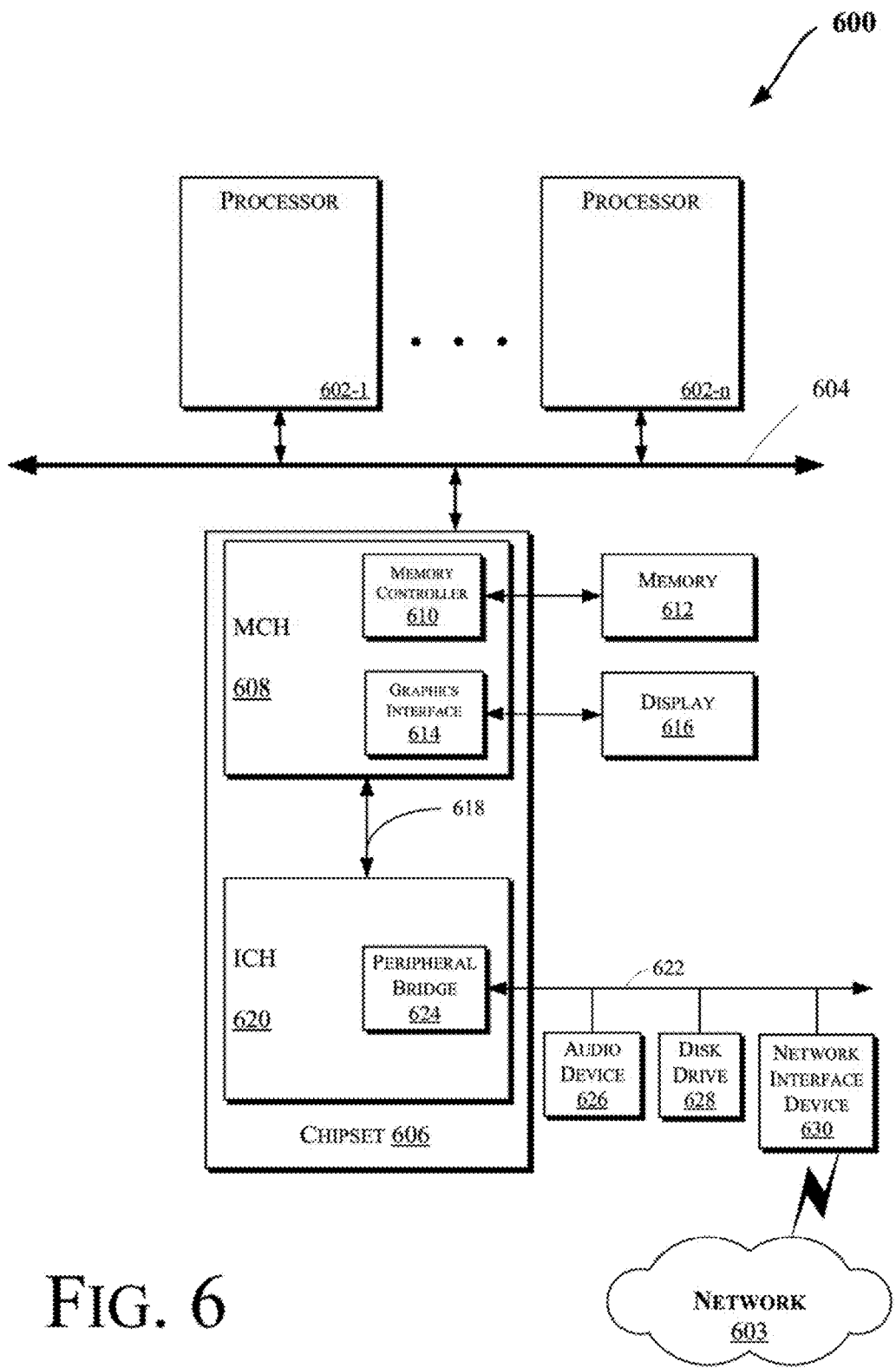
FIGS. 6-10 are schematic illustrations of electronic devices which may be adapted to implement geofencing in accordance with some embodiments.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s). USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
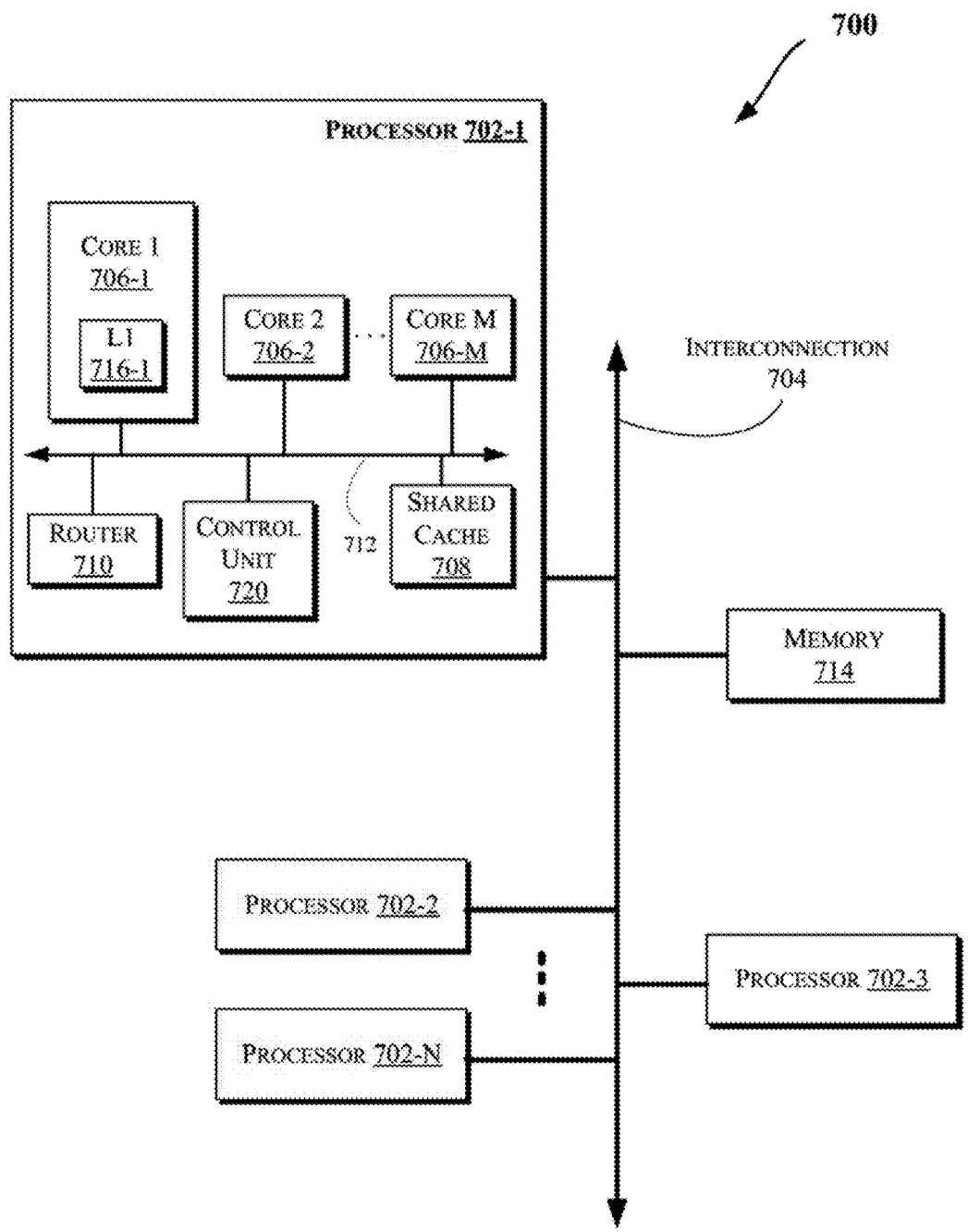

FIG. 7 illustrates a block diagram of a computing system 7000, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716"). In one embodiment, the control unit 720 may include logic to implement the operations described above with reference to the memory controller 122 in FIG. 2.

Figure 8:
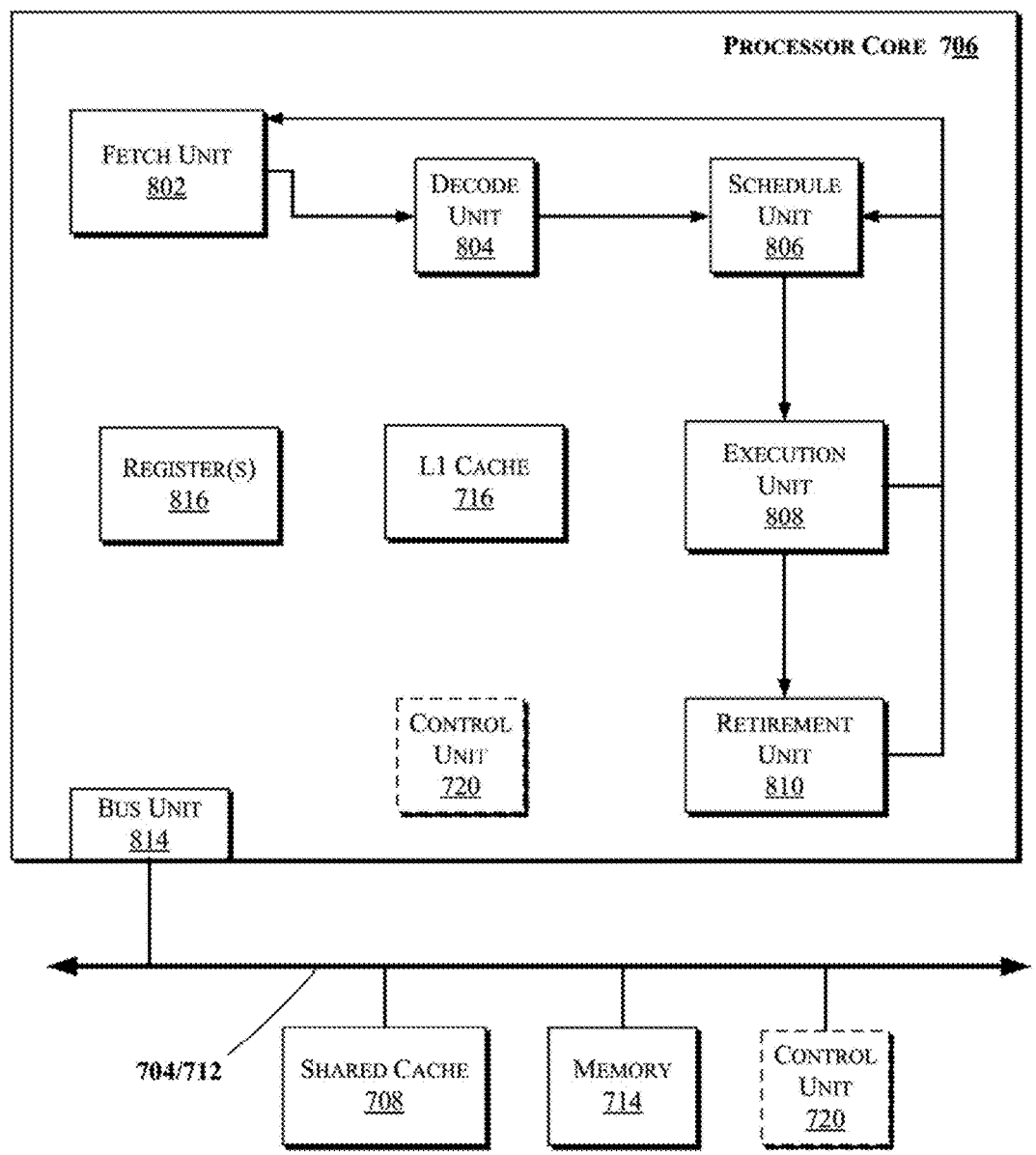

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
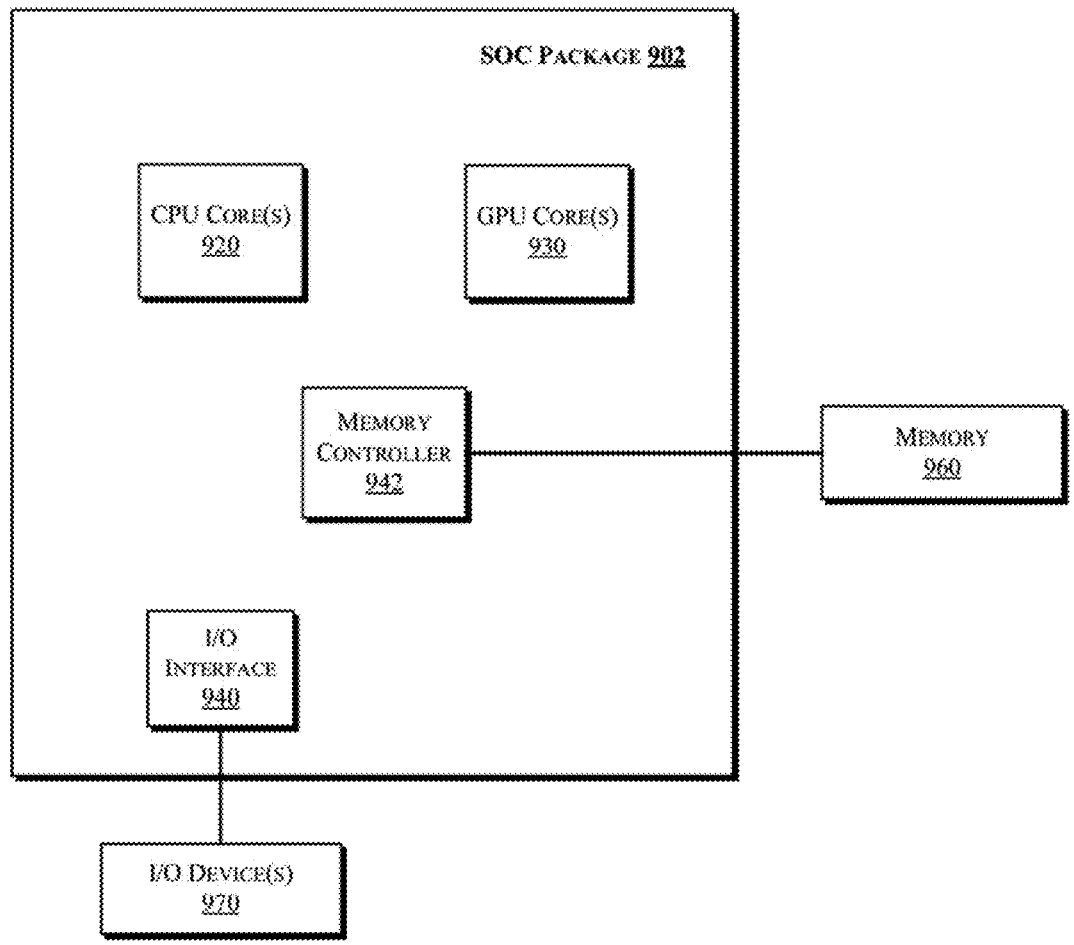

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components. e.g., as discussed with reference to the other figures herein. In one embodiment. SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
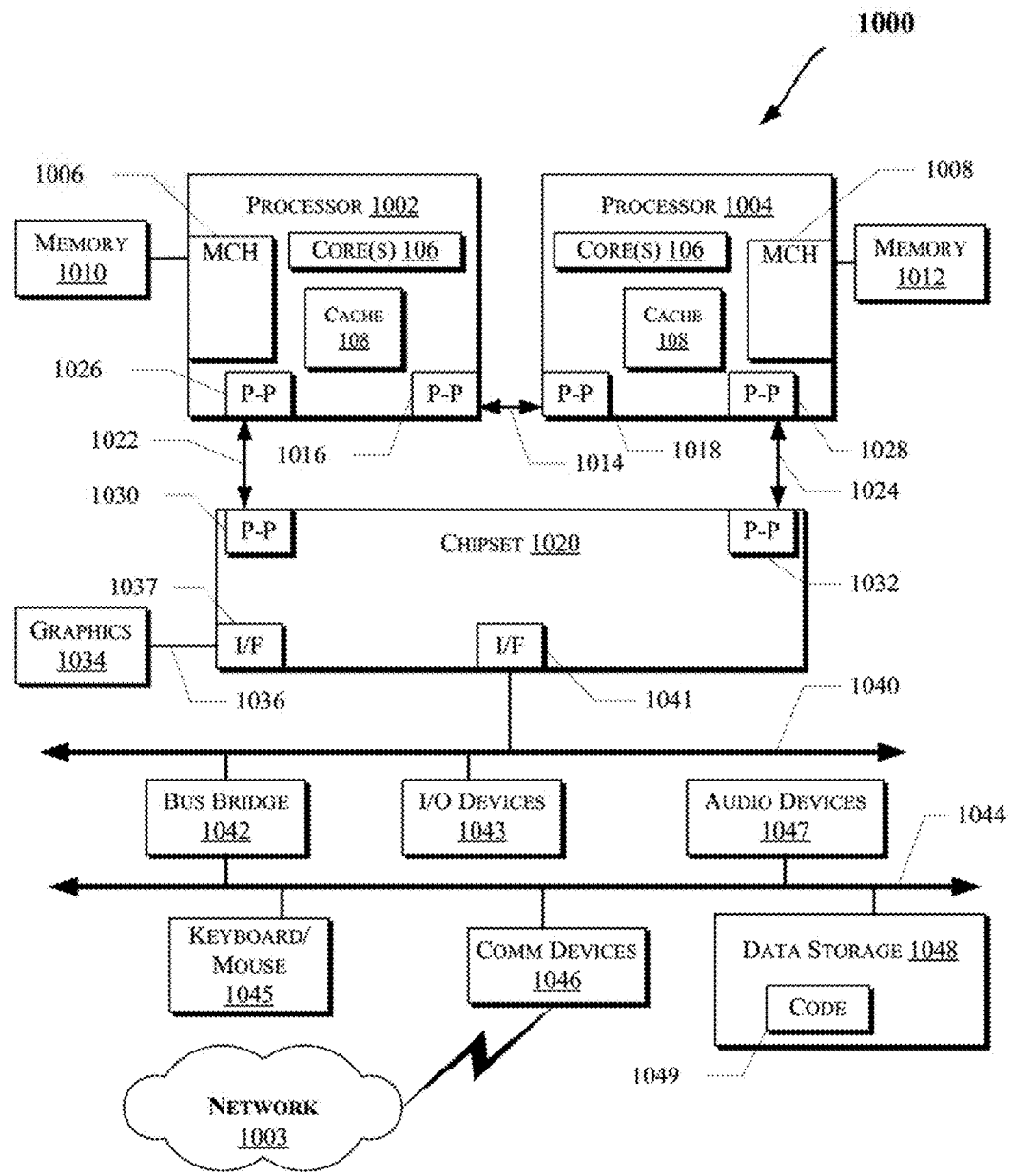

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some embodiments.

In an embodiment, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other embodiments of the invention, however, may exist in other circuits, logic units, or devices within the system 1000 of FIG. 10. Furthermore, other embodiments of the invention may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further embodiments.

Example 1 is an apparatus comprising logic, at least partially including hardware logic, configured to establish a geographic reference point, define one or more geofences relative to the geographic reference point, determine, based on an input from at least one inertial sensor, a location of the apparatus relative to the geographic reference point, and generate a warning signal in response to a determination that the location of the apparatus is outside the one or more geofences.

In Example 2, the subject matter of Example 1 can optionally include logic further configured to establish a geographic reference point in response to at least one of an input signal from a user interface and a determination that the apparatus has been stationary for a time period that exceeds a time threshold.

In Example 3, the subject matter of any one of Examples 1-2 can optionally include logic further configured to generate a deactivation signal for one or more network based location services after the geographic reference point has been established.

In Example 4, the subject matter of any one of Examples 1-3 can optionally include logic further configured to generate an activation signal for one or more network based location services in response to the warning signal.

In Example 5, the subject matter of any one of Examples 1-4 can optionally include logic further configured determine a location from the one or more network based location services.

In Example 6, the subject matter of any one of Examples 1-5 can optionally include logic further configured to provide the location of the apparatus to a processor.

In Example 7, the subject matter of any one of Examples 1-6 can optionally include logic further configured to reset the geographic reference point when the apparatus remains stationary for a predetermined period of time.

In Example 8, the subject matter of any one of Examples 1-7 can optionally include logic further configured to generate an activation signal for one or more alarms in response to the warning signal.

In Example 9, the subject matter of any one of Examples 1-3 can optionally include logic further configured to receive orientation data from an orientation sensor and acceleration data from an acceleration sensor and determine a normalized value of acceleration on the apparatus due to gravity in a three dimensional space.

In Example 10, the subject matter of any one of Examples 1-9 can optionally include logic further configured to sample, on a periodic basis, orientation data from the orientation sensor, acceleration data from the acceleration sensor and determine, based on a comparison between the normalized value of acceleration on the apparatus due to gravity and the orientation data and acceleration data, whether the apparatus is in motion.

In Example 11, the subject matter of any one of Examples 1-10 can optionally include logic further configured to monitor acceleration data in a Z axis to determine whether a user of the apparatus is walking.

In Example 12, the subject matter of any one of Examples 1-11 can optionally include logic further configured to monitor state transitions from a sitting state to a standing state and a walking state, and one or more intermediate transition states.

In Example 13, the subject matter of any one of Examples 1-12 can optionally include logic further configured to determine a half-step calculation using motion direction and average time for a half step.

In Example 14, the subject matter of any one of Examples 1-13 can optionally include logic further configured to calculate an average time for a half step using a quadratic equation with one or more heuristically calculated coefficients.

Example 15 is an electronic device, comprising an accelerometer, one or more wireless communication devices, logic, at least partially including hardware logic, configured to establish a geographic reference point, define one or more geofences relative to the geographic reference point, determine, based on an input from at least one inertial sensor, a location of the apparatus relative to the geographic reference point, and
    generate a warning signal in response to a determination that the location of the apparatus is outside the one or more geofences.

In Example 16, the subject matter of Example 15 can optionally include logic further configured to establish a geographic reference point in response to at least one of an input signal from a user interface and a determination that the apparatus has been stationary for a time period that exceeds a time threshold.

In Example 17, the subject matter of any one of Examples 15-16 can optionally include logic further configured to generate a deactivation signal for one or more network based location services after the geographic reference point has been established.

In Example 17, the subject matter of any one of Examples 15-17 can optionally include logic further configured to generate an activation signal for one or more network based location services in response to the warning signal.

In Example 19, the subject matter of any one of Examples 15-18 can optionally include logic further configured to determine a location from the one or more network based location services.

In Example 20, the subject matter of any one of Examples 15-19 can optionally include logic further configured to provide the location of the apparatus to a processor.

In Example 21, the subject matter of any one of Examples 15-20 can optionally include logic further configured to reset the geographic reference point when the apparatus remains stationary for a predetermined period of time.

In Example 22, the subject matter of any one of Examples 15-21 can optionally include logic further configured to generate an activation signal for one or more alarms in response to the warning signal.

In Example 23, the subject matter of any one of Examples 15-22 can optionally include logic further configured to receive orientation data from an orientation sensor and acceleration data from an acceleration sensor and determine a normalized value of acceleration on the apparatus due to gravity in a three dimensional space.

In Example 24, the subject matter of any one of Examples 15-23 can optionally include logic further configured to sample, on a periodic basis, orientation data from the orientation sensor, acceleration data from the acceleration sensor, and determine, based on a comparison between the normalized value of acceleration on the apparatus due to gravity and the orientation data and acceleration data, whether the apparatus is in motion.

In Example 25, the subject matter of any one of Examples 15-24 can optionally include logic further configured to monitor acceleration data in a Z axis to determine whether a user of the apparatus is walking.

In Example 26, the subject matter of any one of Examples 15-25 can optionally include logic further configured to monitor state transitions from a sitting state to a standing state and a walking state, and one or more intermediate transition states.

In Example 27, the subject matter of any one of Examples 15-26 can optionally include logic further configured to determine a half-step calculation using motion direction and average time for a half step.

In Example 28, the subject matter of any one of Examples 15-27 can optionally include logic further configured to calculate an average time for a half step using a quadratic equation with one or more heuristically calculated coefficients.

Example 29 is a computer program product comprising logic instructions stored on a tangible computer readable medium which, when executed by a controller, configure the controller to establish a geographic reference point, define one or more geofences relative to the geographic reference point, determine, based on an input from at least one inertial sensor, a location of the apparatus relative to the geographic reference point, and generate a warning signal in response to a determination that the location of the apparatus is outside the one or more geofences.

In Example 30, the subject matter Example 29 can optionally include logic instructions that further configure the controller to establish a geographic reference point in response to at least one of an input signal from a user interface, and a determination that the apparatus has been stationary for a time period that exceeds a time threshold.

In Example 31, the subject matter of any one of Examples 29-30 can optionally include logic instructions that further configure the controller to generate a deactivation signal for one or more network based location services after the geographic reference point has been established.

In Example 32, the subject matter of any one of Examples 29-31 can optionally include logic instructions that further configure the controller to generate an activation signal for one or more network based location services in response to the warning signal.

In Example 33, the subject matter of any one of Examples 29-32 can optionally include logic instructions that further configure the controller to determine a location from the one or more network based location services.

In Example 34, the subject matter of any one of Examples 29-33 can optionally include logic instructions that further configure the controller to provide the location of the apparatus to a processor.

In Example 35, the subject matter of any one of Examples 29-34 can optionally include logic instructions that further configure the controller to reset the geographic reference point when the apparatus remains stationary for a predetermined period of time.

In Example 36, the subject matter of any one of Examples 29-35 can optionally include logic instructions that further configure the controller to generate an activation signal for one or more alarms in response to the warning signal.

In Example 37, the subject matter of any one of Examples 29-36 can optionally include logic instructions that further configure the controller to receive orientation data from an orientation sensor and acceleration data from an acceleration sensor and determine a normalized value of acceleration on the apparatus due to gravity in a three dimensional space.

In Example 38, the subject matter of any one of Examples 29-37 can optionally include logic instructions that further configure the controller to sample, on a periodic basis, orientation data from the orientation sensor, acceleration data from the acceleration sensor and determine, based on a comparison between the normalized value of acceleration on the apparatus due to gravity and the orientation data and acceleration data, whether the apparatus is in motion.

In Example 39, the subject matter of any one of Examples 29-38 can optionally include logic instructions that further configure the controller to monitor acceleration data in a Z axis to determine whether a user of the apparatus is walking.

In Example 40, the subject matter of any one of Examples 29-39 can optionally include logic instructions that further configure the controller to monitor state transitions from a sitting state to a standing state and a walking state, and one or more intermediate transition states.

In Example 41, the subject matter of any one of Examples 29-40 can optionally include logic instructions that further configure the controller to determine a half-step calculation using motion direction and average time for a half step.

In Example 42, the subject matter of any one of Examples 29-41 can optionally include logic instructions that further configure the controller to calculate an average time for a half step using a quadratic equation with one or more heuristically calculated coefficients.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media.

However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
   logic, at least partially including hardware logic, configured to:
     establish a geographic reference point;
     define one or more geofences relative to the geographic reference point;
     determine, based on an input from at least one inertial sensor whether the apparatus is in motion, and in response to a determination that the apparatus is in motion, to calculate a distance from the geographic reference point a user has traveled by instituting a flag that flips between a first state corresponding to a first time period during which the user is launching a step and a second state corresponding to a second time period during which the user is completing the step, wherein the state of the flag flips based on a slope of a z-axis gravity output from an accelerometer; and generate a warning signal in response to a determination that the distance from the geographic reference point the user has traveled places the apparatus is outside the one or more geofences.

2. The apparatus of claim 1, wherein the logic is further configured to establish a geographic reference point in response to at least one of:

an input signal from a user interface; and a determination that the apparatus has been stationary for a time period that exceeds a time threshold.

3. The apparatus of claim 1, wherein the logic is further configured to generate a deactivation signal for one or more network based location services after the geographic reference point has been established.

4. The apparatus of claim 1, wherein the logic is further configured to generate an activation signal for one or more network based location services in response to the warning signal.

5. The apparatus of claim 1, wherein the logic is further configured to:

determine a location from the one or more network based location services.

6. The apparatus of claim 5, wherein the logic is further configured to:

provide the location of the apparatus to a processor.

7. The apparatus of claim 6, wherein the logic is further configured to reset the geographic reference point when the apparatus remains stationary for a predetermined period of time.

8. The apparatus of claim 1, wherein the logic is further configured to generate an activation signal for one or more alarms in response to the warning signal.

9. The apparatus of claim 1, wherein the logic is further configured to:

receive orientation data from an orientation sensor and acceleration data from an acceleration sensor; and determine a normalized value of acceleration on the apparatus due to gravity in a three dimensional space.

10. The apparatus of claim 9, wherein the logic is further configured to:

sample, on a periodic basis, orientation data from the orientation sensor, acceleration data from the acceleration sensor; and determine, based on a comparison between the normalized value of acceleration on the apparatus due to gravity and the orientation data and acceleration data, whether the apparatus is in motion.

11. The apparatus of claim 10, wherein the logic is further configured to:

monitor acceleration data in a Z axis to determine whether a user of the apparatus is walking.

12. The apparatus of claim 11, wherein the logic is further configured to:

monitor state transitions from a sitting state to a standing state and a walking state, and one or more intermediate transition states.

13. The apparatus of claim 11, wherein the logic is further configured to:

determine a half-step calculation using motion direction and average time for a half step.

14. The apparatus of claim 13, wherein the logic is further configured to:

calculate an average time for a half step using a quadratic equation with one or more heuristically calculated coefficients.

15. An electronic device, comprising:

an accelerometer;

one or more wireless communication devices;

logic, at least partially including hardware logic, configured to:

establish a geographic reference point;

define one or more geofences relative to the geographic reference point;

determine, based on an input from at least one inertial sensor whether the apparatus is in motion, and in response to a determination that the apparatus is in motion, to calculate a distance from the geographic reference point a user has traveled by instituting a flag that flips between a first state corresponding to a first time period during which the user is launching a step and a second state corresponding to a second time period during which the user is completing the step, wherein the state of the flag flips based on a slope of a z-axis gravity output from an accelerometer; and generate a warning signal in response to a determination that the distance from the geographic reference point the user has traveled places the apparatus is outside the one or more geofences.

16. The electronic device of claim 15, wherein the logic is further configured to establish a geographic reference point in response to at least one of:

an input signal from a user interface; and a determination that the apparatus has been stationary for a time period that exceeds a time threshold.

17. The electronic device of claim 15, wherein the logic is further configured to generate a deactivation signal for one or more network based location services after the geographic reference point has been established.

18. The electronic device of claim 15, wherein the logic is further configured to generate an activation signal for one or more network based location services in response to the warning signal.

19. The electronic device of claim 15, wherein the logic is further configured to:

determine a location from the one or more network based location services.

20. The electronic device of claim 19, wherein the logic is further configured to:

provide the location of the apparatus to a processor.

21. The electronic device of claim 20, wherein the logic is further configured to reset the geographic reference point when the apparatus remains stationary for a predetermined period of time.

22. The electronic device of claim 15, wherein the logic is further configured to generate an activation signal for one or more alarms in response to the warning signal.

23. The electronic device of claim 15, wherein the logic is further configured to:

receive orientation data from an orientation sensor and acceleration data from an acceleration sensor; and determine a normalized value of acceleration on the apparatus due to gravity in a three dimensional space.

24. The electronic device of claim 23, wherein the logic is further configured to:
   sample, on a periodic basis, orientation data from the orientation sensor, acceleration data from the acceleration sensor; and
   determine, based on a comparison between the normalized value of acceleration on the apparatus due to gravity and the orientation data and acceleration data, whether the apparatus is in motion.

25. The electronic device of claim 24, wherein the logic is further configured to:
   monitor acceleration data in a Z axis to determine whether a user of the apparatus is walking.

* * * * *